United States Patent
Yang (10) Patent No.: US 11,498,575 B2
(45) Date of Patent: Nov. 15, 2022

(54) UNSUPERVISED LEARNING-BASED DETECTION METHOD AND DRIVER PROFILE- BASED VEHICLE THEFT DETECTION DEVICE AND METHOD USING SAME

(71) Applicants: Suntech International Ltd., Seoul (KR); Seung Hee Yang, Seoul (KR)

(72) Inventor: Seung Hee Yang, Seoul (KR)

(73) Assignees: Suntech International Ltd., Geumcheon-gu (KR); Seung Hee Yang, Seoul (KR)

( * ) Notice: Subject to any disclaimer, the term of this patent is extended or adjusted under 35 U.S.C. 154(b) by 242 days.

(21) Appl. No.: 16/956,992

(22) PCT Filed: Nov. 14, 2019

(86) PCT No.: PCT/KR2019/015542
§ 371 (c)(1),
(2) Date: Jun. 22, 2020

(87) PCT Pub. No.: WO2021/040137
PCT Pub. Date: Mar. 4, 2021

(65) Prior Publication Data
US 2021/0061289 A1 Mar. 4, 2021

(30) Foreign Application Priority Data
Aug. 29, 2019 (KR) .......................... 10-2019-0106420

(51) Int. Cl.
B60W 40/09 (2012.01)
G06N 3/08 (2006.01)
(Continued)

(52) U.S. Cl.
CPC ........... *B60W 40/09* (2013.01); *B60R 25/102* (2013.01); *G06N 3/0454* (2013.01); *G06N 3/088* (2013.01); *B60W 2540/043* (2020.02)

(58) Field of Classification Search
None
See application file for complete search history.

(56) References Cited

U.S. PATENT DOCUMENTS

2019/0302761 A1* 10/2019 Huang .................. G05D 1/0221
2020/0218979 A1* 7/2020 Kwon ....................... G06N 3/08
(Continued)

OTHER PUBLICATIONS

Jun Zhang, et al., "A Deep Learning Framework for Driving Behavior Identification on In-Vehcile CAN-BUS Sensor Data," Dec. 23, 2018, Sensors, Copyright 2019, pp. 1-17 [retrieved from <www.mdpi.com/journal/sensors>].
(Continued)

*Primary Examiner* — Fekadeselassie Girma
(74) *Attorney, Agent, or Firm* — Banner & Witcoff, Ltd.

(57) ABSTRACT

An unsupervised learning-based detection method according to one technical aspect of the present disclosure relates to an unsupervised learning-based detection method using a supervised-learned model, and includes: generating a first plurality of matrix data on the basis of driving data; generating encoding information by encoding the first plurality of matrix data using a convolutional neural network; modeling a time series feature of the encoding information by using a long short-term memory (LSTM) network, so as to derive a correlation between variables according to a time series; re-implementing a second plurality of matrix data through a deconvolution calculation of the correlation between the variables according to the time series; and determining whether the driving data corresponds to a pre-supervised learned driver profile, on the basis of a difference between
(Continued)

the first plurality of matrix data and the second plurality of matrix data.

12 Claims, 8 Drawing Sheets

(51) Int. Cl.
   *B60R 25/102* (2013.01)
   *G06N 3/04* (2006.01)

(56) References Cited

U.S. PATENT DOCUMENTS

| | | | |
|---|---|---|---|
| 2021/0061289 A1* | 3/2021 | Yang | G06N 3/0445 |
| 2021/0088784 A1* | 3/2021 | Whitmire | G02B 27/017 |
| 2022/0153300 A1* | 5/2022 | Kwatra | B60W 40/09 |

OTHER PUBLICATIONS

Chuxu Zhang, et al., "A Deep Neural Network for Unsupervised Anomaly Detection and Diagnosis in Multivariate Time Series Data," Nov. 20, 2018, Association for the Advancement of Artificial Intelligence, Copyright 2019, pp. 1-9 [retrieved from <www.aaai.org>].

Mar. 24, 2021—(KR) Notice of Submission of Opinion—App. No. 10-2019-0106420 w/ machine translation.

* cited by examiner

UNSUPERVISED LEARNING-BASED DETECTION METHOD AND DRIVER PROFILE- BASED VEHICLE THEFT DETECTION DEVICE AND METHOD USING SAME

CROSS-REFERENCE TO RELATED APPLICATIONS

This application is a U.S. National Stage application under 35 U.S.C. § 371 of International Application PCT/KR2019/015542, filed Nov. 14, 2019 which claims the benefit of priority to Korean Patent Application 10-2019-0106420, filed Aug. 29, 2019. Benefit of the filing date of each of these prior applications is hereby claimed. Each of these prior applications is hereby incorporated by reference in its entirety.

BACKGROUND OF THE INVENTION

1. Field of the Invention

The present disclosure relates to an unsupervised learning-based detection method and a driver profile-based vehicle theft detection device and method using the same.

2. Description of the Prior Art

As artificial intelligence technology develops, a learning theory is also developing in depth. Further, various security technologies are being combined based on such a learning theory.

For example, theft and security threats to mobile assets such as a vehicle may cause secondary damage, such as person injury as well as loss of property. Recently, more intelligent security technologies are being developed based on various learning theories.

As a conventional learning-based security technology, in a state where a specific driver is predetermined, a technology for identifying a driver by performing modeling on the basis of data, such as the corresponding driver's accelerator pedal operation information, brake pedal operation information, a vehicle speed, and information on a distance from a vehicle ahead has been developed. In the case of such a conventional technology, a relatively accurate recognition can be obtained for a specific driver whose driving data is sufficiently secured, that is, in a supervised learning environment. However, in the case where a vehicle is stolen by an unrecognized driver, data that has not been observed is input, and thus driver recognition becomes impossible or a seek error increases.

In other words, the conventional supervised learning-based detection technique can be applied only to a pre-observed driver. In particular, in an unlearned environment in which driver data which has not been pre-observed, such as, in the case of a stolen vehicle, is input, there is a limitation in that the recognition and detection accuracy becomes low.

SUMMARY OF THE INVENTION

The present disclosure has been made in order to solve the above-mentioned problems in the prior art, and the present disclosure is to provide an unsupervised learning-based detection method and a driver profile-based vehicle theft detection device and method using the same, in which modeling obtained based on supervised learning is applied to an unsupervised learning method, so as to enable accurate detection even in a condition that has not been previously learned.

The above technical aspects and various advantages of the present disclosure will become more apparent from preferred embodiments of the present disclosure by those skilled in the art.

One technical aspect of the present disclosure provides an unsupervised learning-based detection method. The unsupervised learning-based detection method relates to an unsupervised learning-based detection method using a supervised-learned model, and includes: generating a first plurality of matrix data on the basis of driving data; generating encoding information by encoding the first plurality of matrix data using a convolutional neural network; modeling a time series feature of the encoding information by using a long short-term memory (LSTM) network, so as to derive a correlation between variables according to a time series; re-implementing a second plurality of matrix data through a deconvolution calculation of the correlation between the variables according to the time series; and determining whether the driving data corresponds to a pre-supervised learned driver profile, on the basis of a difference between the first plurality of matrix data and the second plurality of matrix data.

In an embodiment, the driving data is multivariate data that generates a plurality of variables at every time point, and has a time series feature having a high correlation of a predetermined level or higher with respect to time.

In an embodiment, the determining whether the driving data corresponds to the driver profile may include determining that the driving data does not correspond to the driver profile if the difference between the first matrix data and the second matrix data is larger than or equal to a threshold value.

In an embodiment, the determining whether the driving data corresponds to the driver profile may include determining that the driving data does not correspond to the driver profile if the difference between the first matrix data and the second matrix data is larger than or equal to a threshold value for a predetermined time or more.

Another technical aspect of the present disclosure provides a driver profile-based vehicle theft detection method. The driver profile-based vehicle theft detection method includes: modeling a basic driver profile by performing supervised learning on the basis of basic driving data collected while a basic driver is driving; and performing unsupervised learning of first driving data collected while a current driver is driving, using a model derived through the supervised learning, so as to determine whether the current driver corresponds to the basic driver.

In an embodiment, the determining whether the current driver corresponds to the basic driver may include: modeling the first driving data using the model, and deriving second driving data by performing reverse modeling on a result of the modeling; and determining whether the current driver corresponds to the basic driver on the basis of a difference between the first driving data and the second driving data.

In an embodiment, the deriving of the second driving data by performing the reverse modeling may include: generating encoding information by encoding the first driving data using a convolutional neural network; modeling a time series feature of the encoding information by using a long short-term memory (LSTM) network, so as to derive a correlation between variables according to a time series; and re-implementing the second driving data through a deconvolution calculation of the correlation between the variables according to the time series.

In an embodiment, the determining whether the current driver corresponds to the basic driver may include: determining that the current driver does not correspond to the basic driver if the difference between the first driving data and the second driving data is larger than or equal to a threshold value.

In an embodiment, the determining whether the current driver corresponds to the basic driver may include: determining that the current driver does not correspond to the basic driver if the difference between the first driving data and the second driving data is larger than or equal to a threshold value for a predetermined time or more.

In an embodiment, the driver profile-based vehicle theft detection method may further include: detecting the first driving data on a rule basis so as to update the threshold value for the difference between the first driving data and the second driving data.

Still another technical aspect of the present disclosure provides a driver profile-based vehicle theft detection device. The driver profile-based vehicle theft detection device includes: a supervised-learning modeling unit configured to model a basic driver profile by performing supervised learning on the basis of basic driving data collected while a basic driver is driving; and an abnormal driving determination unit configured to determine whether a current driver corresponds to the basic driver by performing unsupervised learning of first driving data collected while the current driver is driving, using a model generated by the supervised-learning modeling unit.

In an embodiment, the driver profile-based vehicle theft detection device may further include: a theft alarm unit configured to provide a theft alarm to the basic driver if the abnormal driving determination unit determines that the current driver is different from the basic driver.

In an embodiment, the abnormal driving determination unit may model the first driving data using the model, derive second driving data by performing reverse modeling on a result of the modeling, and determine that the current driver differs from the basic driver if a difference between the first driving data and the second driving data is larger than or equal to a threshold value.

In an embodiment, the driver profile-based vehicle theft detection device may further include: a rule-based determination support unit for detecting the first driving data on a rule basis and updating the threshold value for the difference between the first driving data and the second driving data.

Measures for solving the above problems do not enumerate all the features of the present disclosure. Various measures for solving the problems of the present disclosure will be understood in more detail with reference to specific embodiments of the following detailed description.

According to an embodiment of the present disclosure, even data for which learning is not to be performed can be identified based on an unsupervised-learning algorithm, and thus detection of unlearned data can be performed.

Further, according to an embodiment of the present disclosure, it is possible to detect a case in which a stolen vehicle is driven, and thus it is possible to detect whether driving of a stolen vehicle occurs without learning about a driver who has stolen a vehicle.

According to an embodiment of the present disclosure, it is possible to adjust critical data of learning modeling by analyzing a large amount of state information in order to detect an abnormal driving pattern, so as to enable more accurate detection.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, preferred embodiments of the present disclosure will be described with reference to the accompanying drawings.

However, embodiments of the present disclosure may be modified in various other forms, and the scope of the present disclosure is not limited to embodiments described below. In addition, embodiments of the present disclosure are provided to more completely explain the present disclosure to those skilled in the art.

Figure 1:
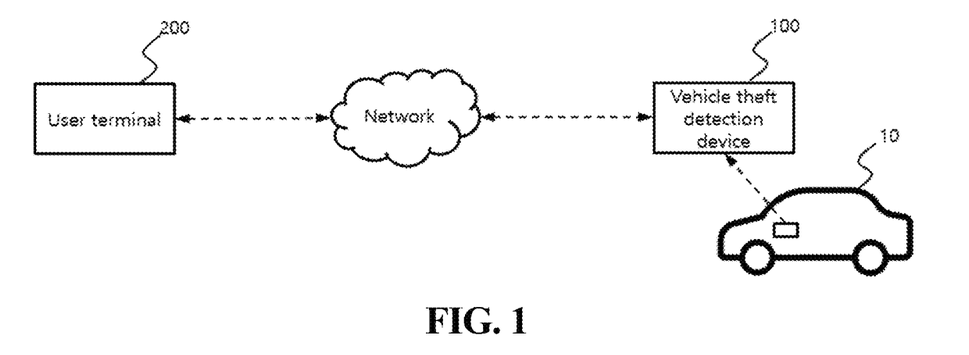
FIG. 1 illustrates an application example of a vehicle theft detection device according to an embodiment of the present disclosure.

FIG. 1 illustrates an application example of a vehicle theft detection device according to an embodiment of the present disclosure.

Referring to FIG. 1, a vehicle theft detection device 100 according to the present disclosure may be provided in a vehicle 10, and may determine whether a current vehicle has been stolen on the basis of a driving state of the vehicle.

The vehicle theft detection device 100 may generate a driver profile by performing supervised learning-based modeling on the basis of driving data of a basic driver—a legitimate driver of a vehicle-.

The vehicle theft detection device 100 may determine whether current driving is performed by the basic driver, by reflecting a model obtained by the supervised learning into an unsupervised learning-based current driving state.

If it is determined that the current driving is not performed by the basic driver, the vehicle theft detection device 100 may notify a user terminal 200 of the basic driver that the current vehicle has been stolen and is being driven.

Accordingly, the basic driver can immediately identify driving of a stolen vehicle in real time, and can quickly respond thereto.

Figure 2:
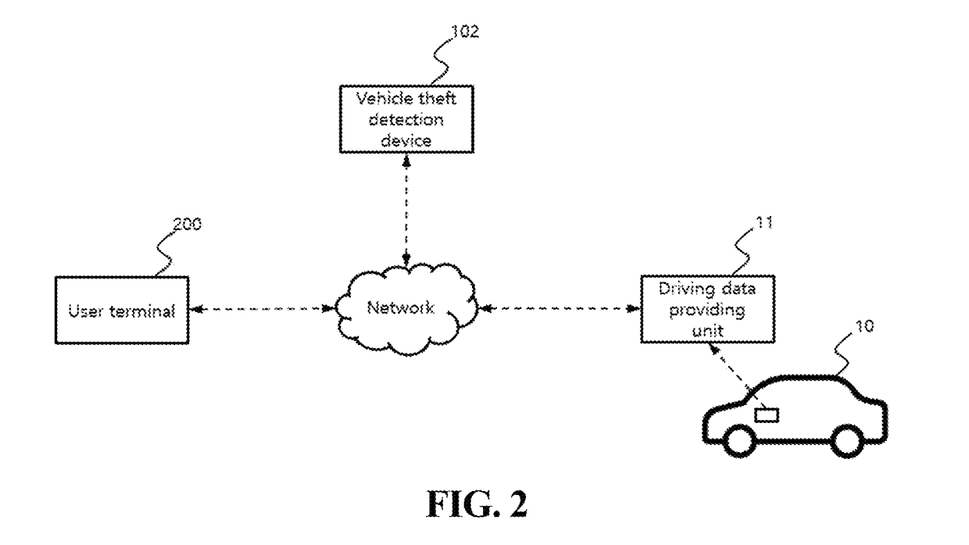
FIG. 2 illustrates another application example of a vehicle theft detection device according to an embodiment of the present disclosure.

FIG. 2 illustrates another application example of the vehicle theft detection device according to an embodiment of the present disclosure.

A vehicle theft detection device 102 may be provided separately from the vehicle 10 as in an example shown in FIG. 2. For example, the vehicle theft detection device 102 may be implemented in the form of a separate server. In this case, the vehicle 10 includes a driving data providing unit 11 configured to collect driving data of a vehicle and transmits the driving data to the vehicle theft detection device 102. The vehicle theft detection device 102 may determine whether a current vehicle is driven by the basic driver, on the basis of data provided by the driving data providing unit 11, and provide information relating to the determination to the user terminal 200.

According to an embodiment, some elements of the vehicle theft detection device 102 may be provided in the vehicle 10, and the other elements may be implemented outside the vehicle, for example, implemented in a form of a separate server.

Therefore, an embodiment of the vehicle theft detection devices 100 and 102 in the present application may not be limited to being physically located in the vehicle 10, and it would be obvious that the vehicle theft detection device according to the present disclosure include various embodiments which are variously modified and performed.

Figure 3:
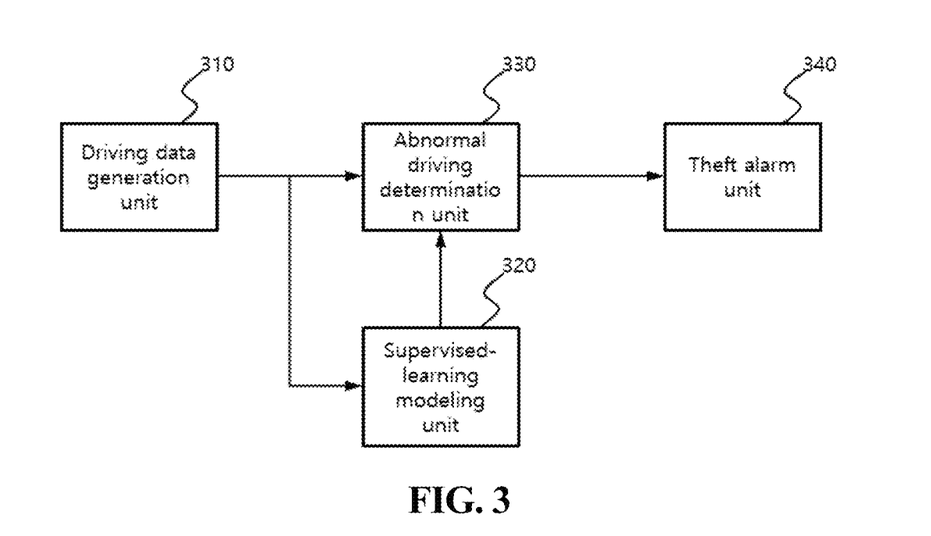
FIG. 3 is a flowchart illustrating a driver profile-based vehicle theft detection method according to an embodiment of the present disclosure.

FIG. 3 is a flowchart illustrating a driver profile-based vehicle theft detection method according to an embodiment of the present disclosure. The vehicle theft detection method illustrated in FIG. 3 may be performed by the vehicle theft detection devices 100 and 102 (hereinafter, representatively represented by 100) illustrated in FIGS. 1 and 2.

Referring to FIG. 3, the vehicle theft detection device 100 may model a basic driver profile by performing supervised learning on the basis of basic driving data collected while a basic driver is driving (indicated by reference numeral S410).

Thereafter, the vehicle theft detection device 100 may perform unsupervised learning of driving data collected during driving of a current driver by using a model derived through the supervised learning, and determine whether the current driver corresponds to the basic driver (indicated by reference numeral S420).

Modeling for a basic driver is configured through supervised learning. The modeling is used to perform encoding and decoding of the current input data, and if there is a difference of a predetermined amount or more between data obtained as a result of decoding and input data, current input data has a different form from that of a model of the basic driver, that is, the input data does not correspond to a basic driver profile, and thus it is determined that a vehicle is driven by a person other than the basic driver.

Hereinafter, a vehicle theft detection device and method will be described in more detail with reference to FIGS. 4 to 10.

Figure 4:
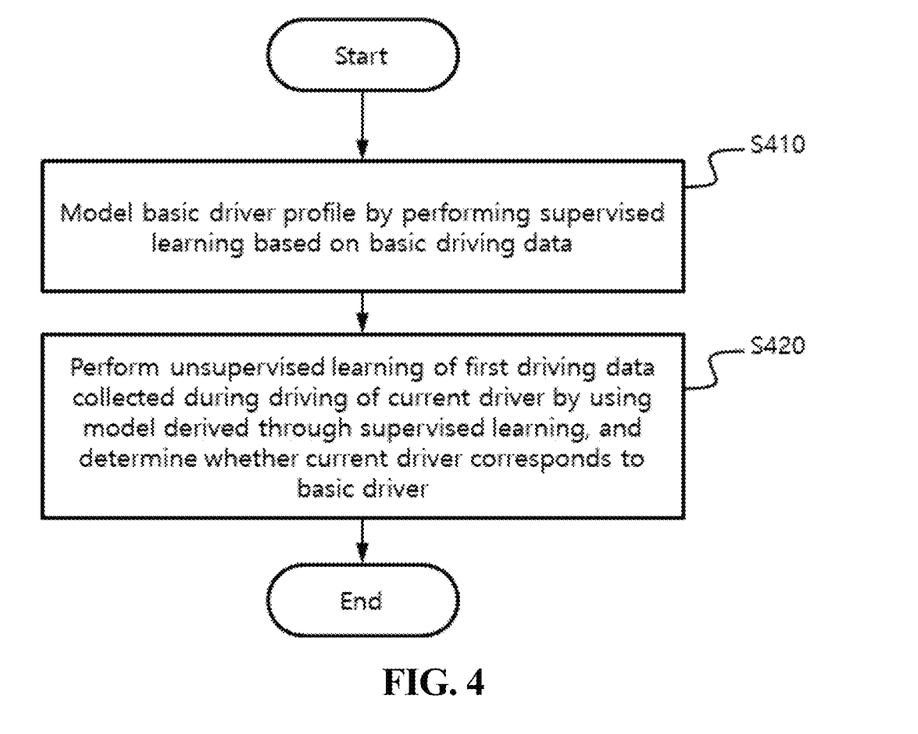
FIG. 4 is a block diagram illustrating a vehicle theft detection device according to an embodiment of the present disclosure.
Figure 6:
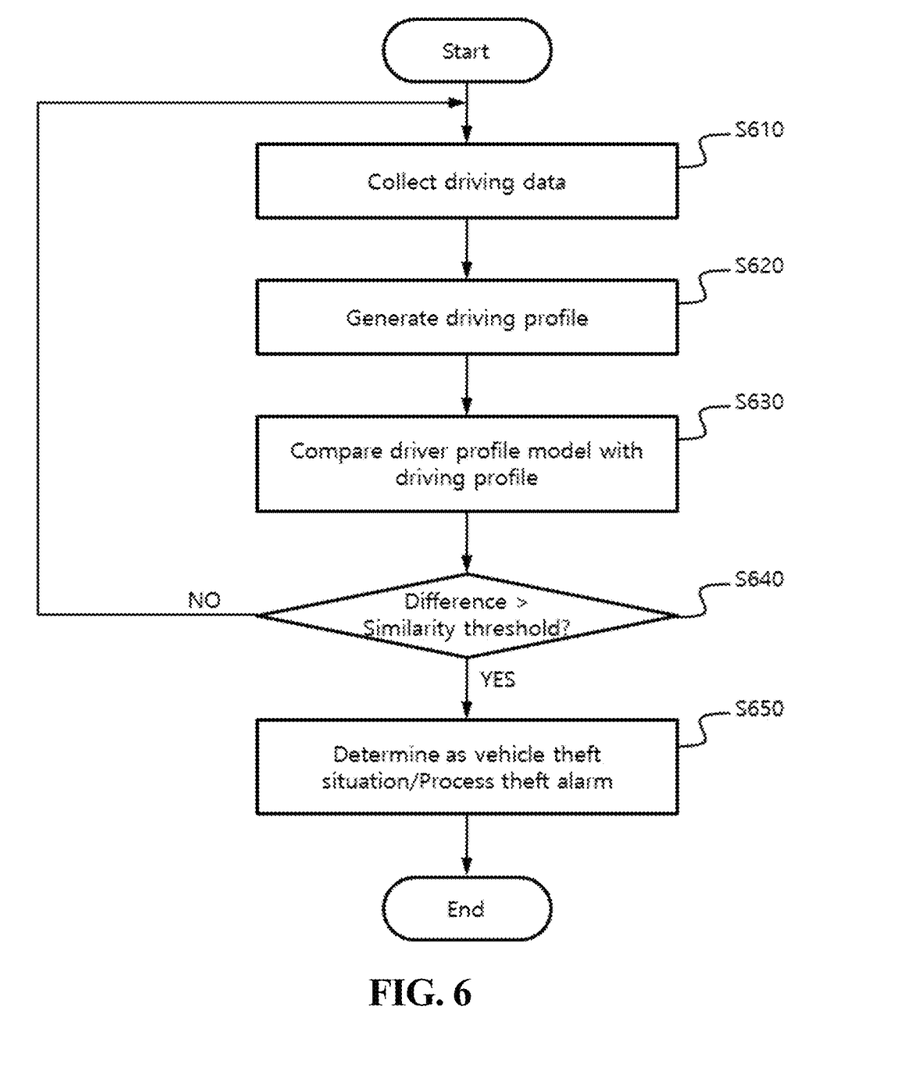
FIG. 6 is a flowchart illustrating an embodiment of a vehicle theft detection method performed by a vehicle theft detection device illustrated in FIG. 4.

FIG. 4 is a block diagram illustrating a vehicle theft detection device according to an embodiment of the present disclosure, and FIG. 6 is a flow chart illustrating an embodiment of a vehicle theft detection method performed by the vehicle theft detection device illustrated in FIG. 4.

Hereinafter, referring to FIGS. 4 and 6, a vehicle theft detection device 100 and a vehicle theft detection method performed by the vehicle theft detection device 100 will be described.

The vehicle theft detection device 100 includes a driving data generation unit 310, a supervised-learning modeling unit 320, and an abnormal driving determination unit 330. According to an embodiment, the vehicle theft detection device 100 may further include a theft alarm unit 340.

The driving data generation unit 310 may generate driving data while the vehicle is running (indicated by reference numeral S610).

The driving data is multivariate data that generates a plurality of variables at every time point, and has a time series feature having a correlation of a predetermined level or higher with respect to time.

For example, the driving data may include the pressure of an acceleration pedal, the pressure of a brake pedal, a vehicle speed, a steering wheel control angle, a vehicle rotation speed, and the like, which are collected at every second while a vehicle is running. Alternatively, the driving data may include at least some thereof.

The driving data is a matrix including the plurality of variables described above, and may be a plurality of matrix data in which values of the plurality of variables change over time.

The supervised-learning modeling unit 320 may model a basic driver profile by performing supervised learning on the basis of basic driving data collected while the basic driver drives a vehicle (indicated by reference numeral S620).

The supervised-learning modeling unit 320 may provide information on the configured modeling to the abnormal driving determination unit 330.

The abnormal driving determination unit 330 determines whether current driving data is obtained from the basic driver by using the modeling provided by the supervised-learning modeling unit 320 (indicated by reference numeral S630).

For example, the abnormal driving determination unit 330 may model first driving data and perform reverse modeling on the result of the modeling, so as to derive second driving data. The abnormal driving determination unit 330 may determine whether a current driver corresponds to the basic driver on the basis of a difference between the first driving data and the second driving data.

For example, if the difference between the first driving data and the second driving data is larger than or equal to a threshold value, the abnormal driving determination unit 330 may determine that the vehicle has been stolen (indicated by reference numeral S640).

The abnormal driving determination unit 330 will be described in more detail below with reference to FIG. 5.

If the abnormal driving determination unit 330 determines that a current driver is different from the basic driver, the theft alarm unit 340 may provide a theft alarm to a user terminal 200 (illustrated in FIG. 1) of the basic driver (indicated by reference numeral S650).

Figure 5:
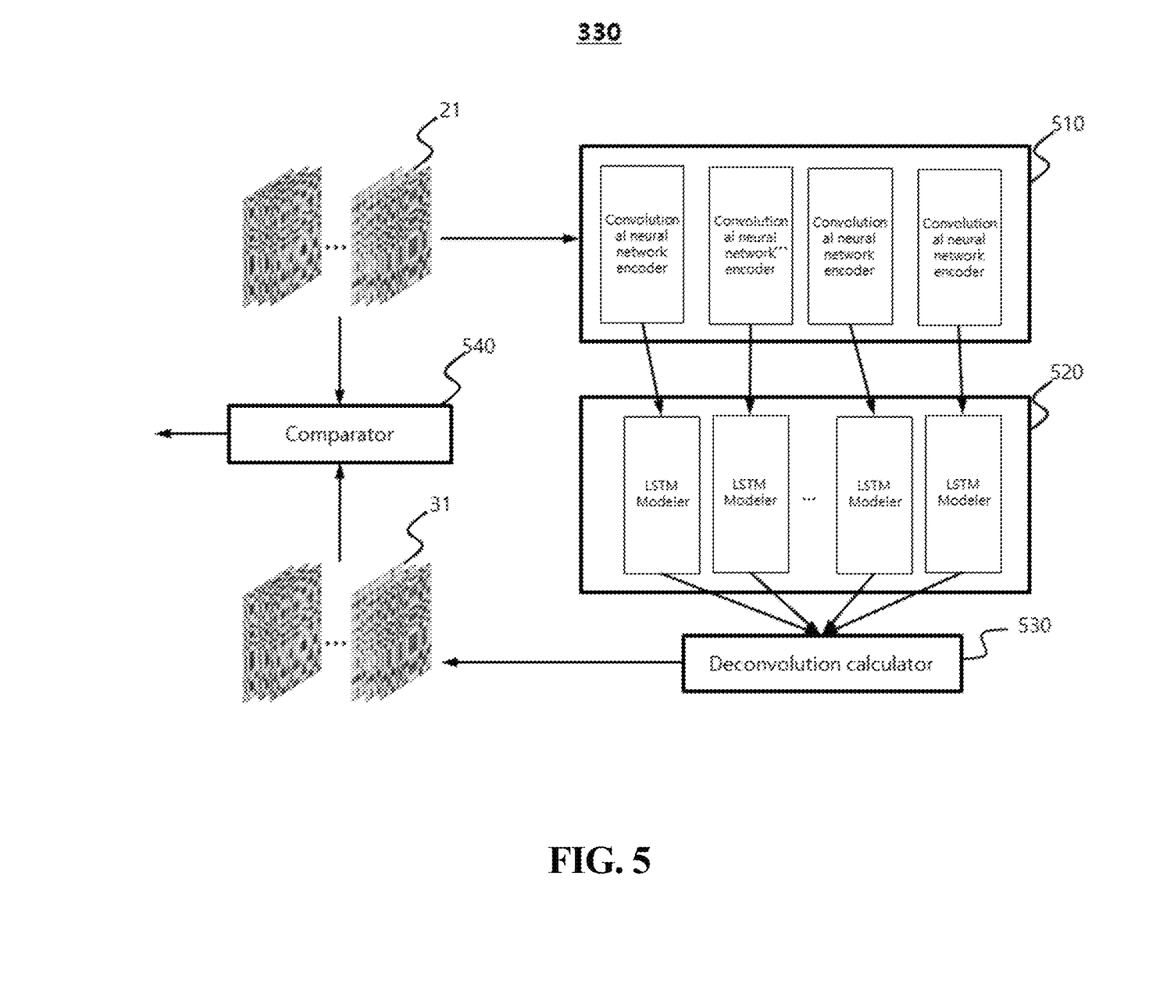
FIG. 5 is a block diagram illustrating an example of an abnormal driving determination unit illustrated in FIG. 3.

FIG. 5 is a block diagram illustrating an embodiment of an abnormal driving determination unit illustrated in FIG. 3. Hereinafter, an embodiment of the abnormal driving determination unit 330 will be described in more detail with reference to FIG. 5.

The abnormal driving determination unit 330 may include a convolutional neural network encoder 510, a long short-term memory (LSTM) modeler 520, a deconvolution calculator 530, and a comparator 540.

The convolutional neural network encoder 510 may receive inputs of driving data, that is, matrices describing a change according to a time series for each variable. The convolutional neural network encoder 510 encodes the matrices by using a convolutional neural network. A plurality of convolutional neural networks are shown, but are not necessarily limited thereto.

The LSTM modeler 520 models a time series feature of encoded information by using a long short-term memory network based on an attention mechanism, so as to derive a correlation between variables according to a time series. A plurality of LSTM networks are also illustrated, but are not necessarily limited thereto.

The deconvolution calculator 530 re-implements the matrix 31 through a deconvolution calculation corresponding to the reverse of an encoding process.

The comparator 540 calculates a difference between an input matrix 21 and a re-implemented matrix 31. If the difference between the input matrix 21 and the re-implemented matrix 31, obtained by the comparator 540, is larger than or equal to the threshold value, the abnormal driving determination unit 330 may determine that the current driving data is obtained not by driving of a basic driver but by driving of a stolen vehicle.

That is, the larger a loss value between the input matrix 21 and the re-implemented matrix 31, the higher the probability of driving of a stolen vehicle. This is because if a similar driving pattern is not observed in learning data, that is, if the probability of abnormal data is high, re-implementation of the input matrix is not possible.

Figure 7:
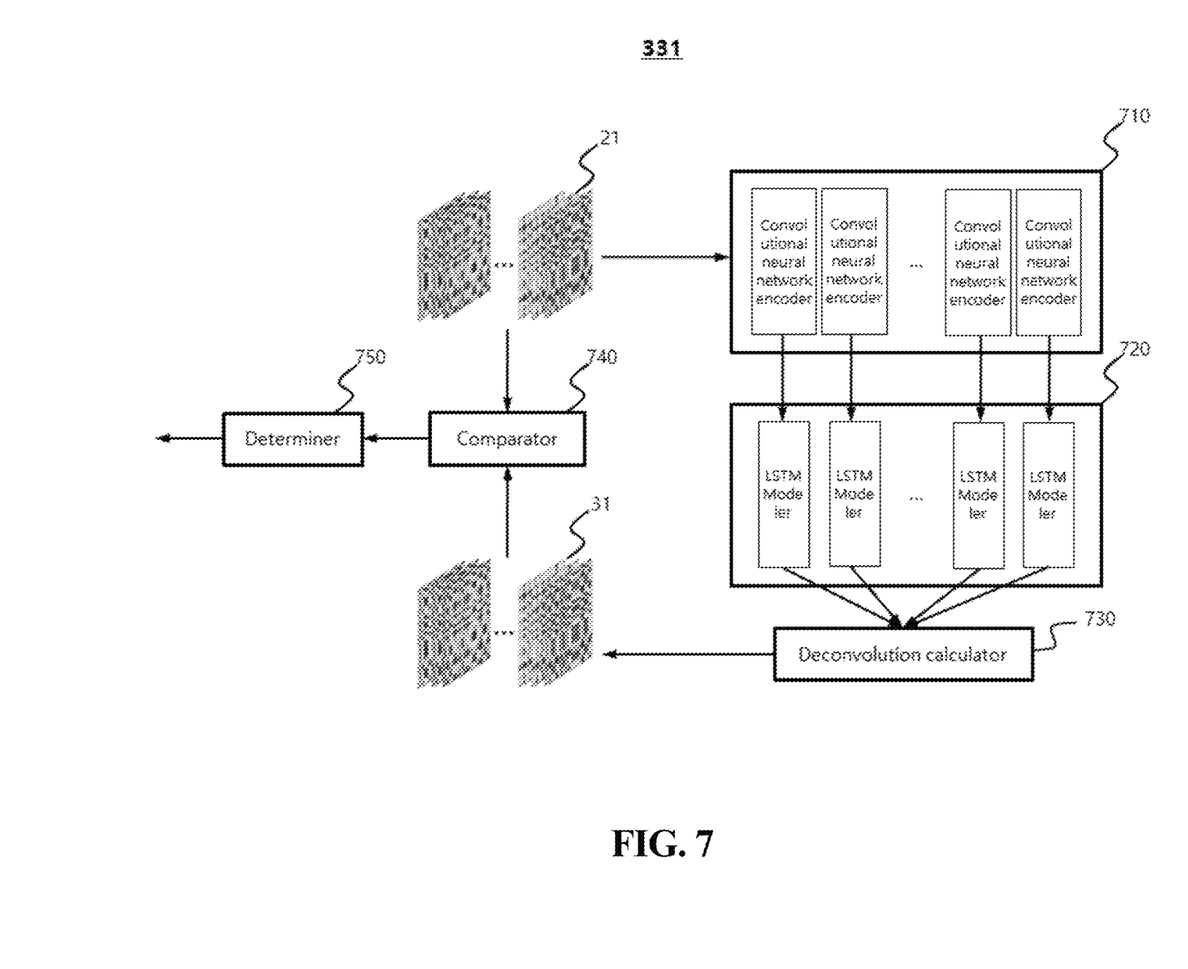
FIG. 7 is a block diagram illustrating another embodiment of an abnormal driving determination unit illustrated in FIG. 3.
Figure 8:
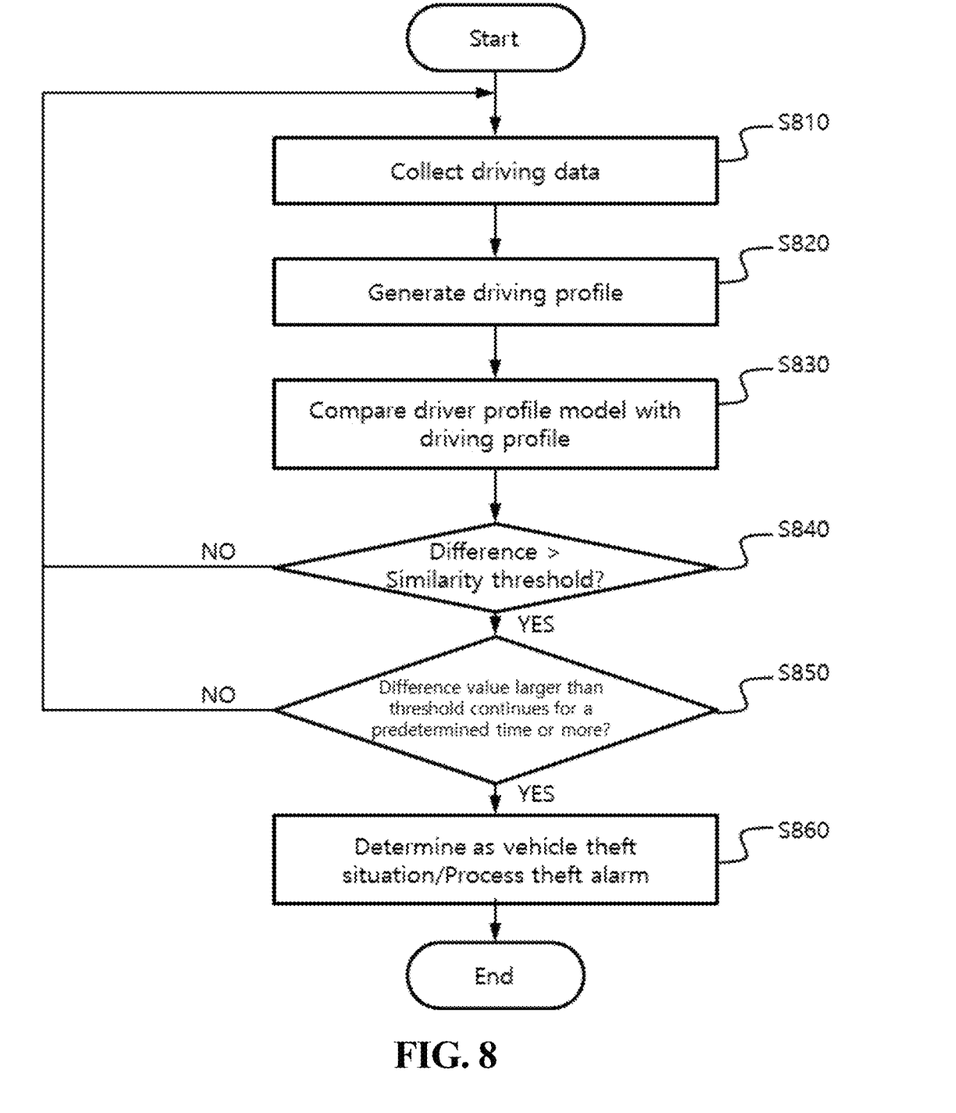
FIG. 8 is a flowchart illustrating another embodiment of a vehicle theft detection method performed by a vehicle theft detection device illustrated in FIG. 4.

FIG. 7 is a block diagram illustrating another embodiment of an abnormal driving determination unit illustrated in FIG. 3, and FIG. 8 is a flowchart illustrating another embodiment of a vehicle theft detection method performed by a vehicle theft detection device illustrated in FIG. 4.

Hereinafter, another embodiment of an abnormal driving determination unit and another embodiment of a vehicle theft detection method according thereto will be described with reference to FIGS. 7 and 8.

Another embodiment 331 of the abnormal driving determination unit includes a convolutional neural network encoder 710, a long short-term memory (LSTM) modeler 720, a deconvolution calculator 730, a comparator 740, and a determiner 750.

Since the convolutional neural network encoder 710, the long short-term memory (LSTM) modeler 720, and the deconvolution calculator 730 can be understood from the foregoing description with reference to FIG. 5, a description thereof will be omitted.

The comparator 740 calculates a difference between an input matrix 21 and a re-implemented matrix 31.

If the difference between the input matrix 21 and the re-implemented matrix 31, obtained by the comparator 740, is larger than or equal to a threshold value (indicated by reference numeral S840, "YES"), and a value larger than or equal to the threshold value continues for a predetermined time or more (indicated by reference numeral S850), the determiner 750 determines that a current driver does not correspond to the basic driver.

Even the same driver may drive in a different pattern depending on the situation, and even in this case faults can be minimized.

Figure 9:
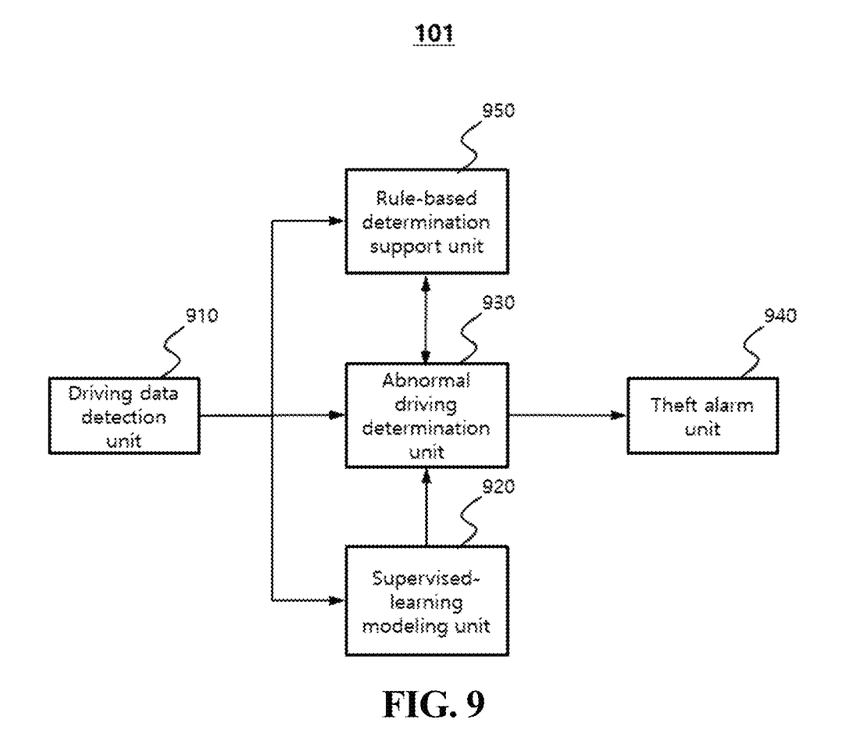
FIG. 9 is a block diagram illustrating another embodiment of a vehicle theft detection device according to an embodiment of the present disclosure.
Figure 10:
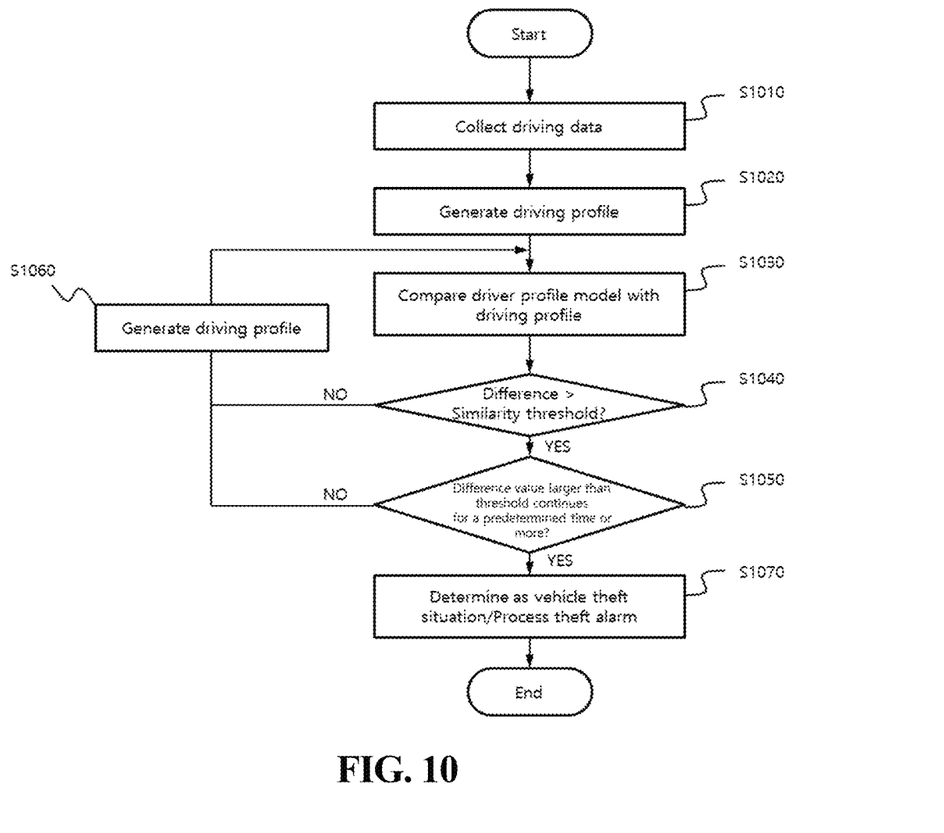
FIG. 10 is a flowchart illustrating an embodiment of a vehicle theft detection method performed by a vehicle theft detection device illustrated in FIG. 9.

FIG. 9 is a block diagram illustrating another embodiment of a vehicle theft detection device according to an embodiment of the present disclosure, and FIG. 10 is a flowchart illustrating an embodiment of a vehicle theft detection method performed by the vehicle theft detection device illustrated in FIG. 9.

Hereinafter, another embodiment of a vehicle theft detection device and method will be described with reference to FIGS. 9 and 10.

Referring to FIG. 9, the vehicle theft detection device 101 includes a driving data generation unit 910, a supervised-learning modeling unit 920, an abnormal driving determination unit 930, and a rule-based determination support unit 950. According to an embodiment, the vehicle theft detection device 101 may further include a theft alarm unit 940.

The driving data generation unit 910, the supervised-learning modeling unit 920, the abnormal driving determination unit 930, and the theft alarm unit 940 can be easily understood from the foregoing descriptions with reference to FIGS. 3 to 8. The description thereof will be omitted.

The rule-based determination supporter 950 may detect driving data on a rule basis, and update the threshold value for a difference between the first driving data and the second driving data.

For example, the rule-based determination support unit 950 may be a large-capacity server that is separately provided, may quickly analyze a large amount of state information, and may update the threshold value based on a rule.

In such an embodiment, an unsupervised learning-based determination is made on whether a vehicle has been stolen, and a threshold value, which is a criterion for theft determination, may be learned and updated based on a rule, and thus the accuracy of determination on the vehicle theft can be dynamically improved.

In the above, the vehicle theft detection technology has been described with reference to FIGS. 1 to 10, but this is for explanation, and embodiments of the present disclosure are not necessarily limited to theft detection.

In other words, the present disclosure may also encompass various other embodiments that perform unlearned based detection by using a model formed on the basis of learning.

Therefore, the present disclosure described above is not limited to the above-described embodiments and the accompanying drawings, but is defined by the claims which will be described below, and it will be apparent to those skilled in the art that the configuration of the present disclosure may be variously changed and modified within the scope and not depart from the technical spirit of the present disclosure.

What is claimed is:

1. An unsupervised learning-based detection method using a supervised learned model, comprising:
generating a first plurality of matrix data on the basis of driving data;
generating encoding information by encoding the first plurality of matrix data using a convolutional neural network;
modeling a time series feature of the encoding information by using a long short-term memory (LSTM) network, so as to derive a correlation between variables according to a time series;
re-implementing a second plurality of matrix data through deconvolution calculation of the correlation between the variables according to the time series; and
determining whether the driving data corresponds to a pre-supervised learned driver profile, on the basis of a difference between the first plurality of matrix data and the second plurality of matrix data.

2. The method of claim 1, wherein the driving data is multivariate data that generates a plurality of variables at every time point, and has a time series feature having a high correlation of a predetermined level or higher with respect to time.

3. The method of claim 1, wherein the determining whether the driving data corresponds to the driver profile comprises: determining that the driving data does not correspond to the driver profile if the difference between the first matrix data and the second matrix data is larger than or equal to a threshold value.

4. The method of claim 1, wherein the determining whether the driving data corresponds to the driver profile comprises: determining that the driving data does not correspond to the driver profile if the difference between the first matrix data and the second matrix data is larger than or equal to a threshold value for a predetermined time or more.

5. A driver profile-based vehicle theft detection method comprising:
    modeling a basic driver profile by performing supervised learning on the basis of basic driving data collected while a basic driver is driving; and performing unsupervised learning of first driving data collected while a current driver is driving, using a model derived through the supervised learning, so as to determine whether the current driver corresponds to the basic driver,
    wherein the determining whether the current driver corresponds to the basic driver comprises:
    modeling the first driving data by using the model, and deriving second driving data by performing reverse modeling on a result of the modeling; and
    determining whether the current driver corresponds to the basic driver on the basis of a difference between the first driving data and the second driving data.

6. The method of claim 1, wherein the deriving of the second driving data by performing the reverse modeling comprises:
    generating encoding information by encoding the first driving data using a convolutional neural network;
    modeling a time series feature of the encoding information by using a long short-term memory (LSTM) network, so as to derive a correlation between variables according to a time series; and
    re-implementing the second driving data through a deconvolution calculation of the correlation between the variables according to the time series.

7. The method of claim 1, wherein the determining whether the current driver corresponds to the basic driver comprises:
    if the difference between the first driving data and the second driving data is larger than or equal to a threshold value, determining that the current driver does not correspond to the basic driver.

8. The method of claim 1, wherein the determining whether the current driver corresponds to the basic driver comprises:
    determining that the current driver does not correspond to the basic driver if the difference between the first driving data and the second driving data is larger than or equal to a threshold value for a predetermined time or more.

9. The method of claim 7, further comprising:
    detecting the first driving data on a rule basis so as to update the threshold value for the difference between the first driving data and the second driving data.

10. A driver profile-based vehicle theft detection device comprising:
    a supervised-learning modeling unit configured to model a basic driver profile by performing supervised learning on the basis of basic driving data collected while a basic driver is driving; and an abnormal driving determination unit configured to determine whether a current driver corresponds to the basic driver by performing unsupervised learning of first driving data collected while the current driver is driving, using a model generated by the supervised-learning modeling unit,
    wherein the abnormal driving determination unit is further configured to:
    model the first driving data by using the model;
    derive second driving data by performing reverse modeling on a result of the modeling; and
    determine that the current driver differs from the basic driver if a difference between the first driving data and the second driving data is larger than or equal to a threshold value.

11. The device of claim 10, further comprising a theft alarm unit configured to provide a theft alarm to the basic driver if the abnormal driving determination unit determines that the current driver is different from the basic driver.

12. The device of claim 10, further comprising a rule-based determination support unit for detecting the first driving data on a rule basis and updating the threshold value for the difference between the first driving data and the second driving data.

* * * * *